(12) United States Patent
Maddukuri et al.

(10) Patent No.: US 11,836,502 B2
(45) Date of Patent: Dec. 5, 2023

(54) MULTI-BOOT SYSTEM AND METHOD FOR A BASEBOARD MANAGEMENT CONTROLLER (BMC)

(71) Applicant: Dell Products, L.P., Round Rock, TX (US)

(72) Inventors: Akkiah Choudary Maddukuri, Austin, TX (US); Chandrasekhar Mugunda, Austin, TX (US); Prashanth Giri, Round Rock, TX (US); Eugene David Cho, Austin, TX (US); Donald W. Gerhart, Leander, TX (US); Yogesh Prabhakar Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 218 days.

(21) Appl. No.: 17/346,931

(22) Filed: Jun. 14, 2021

(65) Prior Publication Data
US 2022/0398103 A1 Dec. 15, 2022

(51) Int. Cl.
*G06F 9/4401* (2018.01)
(52) U.S. Cl.
CPC ............ *G06F 9/441* (2013.01); *G06F 9/4418* (2013.01)
(58) Field of Classification Search
None
See application file for complete search history.

(56) References Cited

U.S. PATENT DOCUMENTS

| | | | |
|---|---|---|---|
| 2009/0271875 A1* | 10/2009 | Kuroda | G06F 21/572 726/30 |
| 2016/0283424 A1* | 9/2016 | Richardson | G06F 11/3058 |
| 2017/0046229 A1* | 2/2017 | Hsu | G06F 9/4401 |
| 2019/0073268 A1* | 3/2019 | Kantor | G06F 11/3636 |
| 2020/0012490 A1* | 1/2020 | Kim | G06F 9/24 |

OTHER PUBLICATIONS

Willis, Nathan, "OpenBMC, a distribution for baseboard management controllers," 2016, Ekektix, Inc., p. 1-8 (https://lwn.net/Articles/683320/) accessed May 1, 2023 (Year: 2016).*

* cited by examiner

*Primary Examiner* — Paul Yen
(74) *Attorney, Agent, or Firm* — Fogarty LLP

(57) ABSTRACT

An Information Handling System (IHS) includes multiple hardware devices, and a baseboard Management Controller (BMC) in communication with the plurality of hardware devices. The BMC includes executable instructions for beginning execution of a first BMC firmware stack, and during execution of the first BMC firmware stack, halt execution of the first BMC firmware stack, and begin execution of a second BMC firmware stack. At least a portion of the executable instructions used to generate the first BMC firmware stack are different than the executable instructions used to generate the second BMC firmware stack.

15 Claims, 4 Drawing Sheets

MULTI-BOOT SYSTEM AND METHOD FOR A BASEBOARD MANAGEMENT CONTROLLER (BMC)

FIELD

The present disclosure generally relates to electronics, and, more particularly, to a multi-boot system and method for a baseboard management controller (BMC).

BACKGROUND

An Information Handling System (IHS) generally refers to any computing system that processes, compiles, stores, and/or communicates information or data for business, personal, or other purposes. Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

An Information Handling System (IHS) includes multiple hardware devices, and a baseboard Management Controller (BMC) in communication with the plurality of hardware devices. The BMC includes executable instructions for beginning execution of a first BMC firmware stack, and during execution of the first BMC firmware stack, halt execution of the first BMC firmware stack, and begin execution of a second BMC firmware stack. At least a portion of the executable instructions used to generate the first BMC firmware stack are different than the executable instructions used to generate the second BMC firmware stack.

According to another embodiment, a method includes the steps of beginning execution of a first BMC firmware stack on a baseboard management controller (BMC). The BMC is in communication with multiple hardware devices of an information handling system (IHS). The method further includes the steps of halting, using the instructions, execution of the first BMC firmware stack, and begin execution of a second BMC firmware stack during execution of the first BMC firmware stack. At least a portion of the executable instructions used to generate the first BMC firmware stack are different than the executable instructions used to generate the second BMC firmware stack.

According to yet another embodiment, an Information Handling System (IHS) includes multiple hardware devices, and a baseboard Management Controller (BMC) in communication with the plurality of hardware devices. The BMC includes executable instructions for receiving selection of a first BMC firmware stack, and verifying that the BMC is licensed to allow execution of the first BMC firmware stack. The instructions then only launch execution of the BMC firmware stack when it is licensed to do so.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
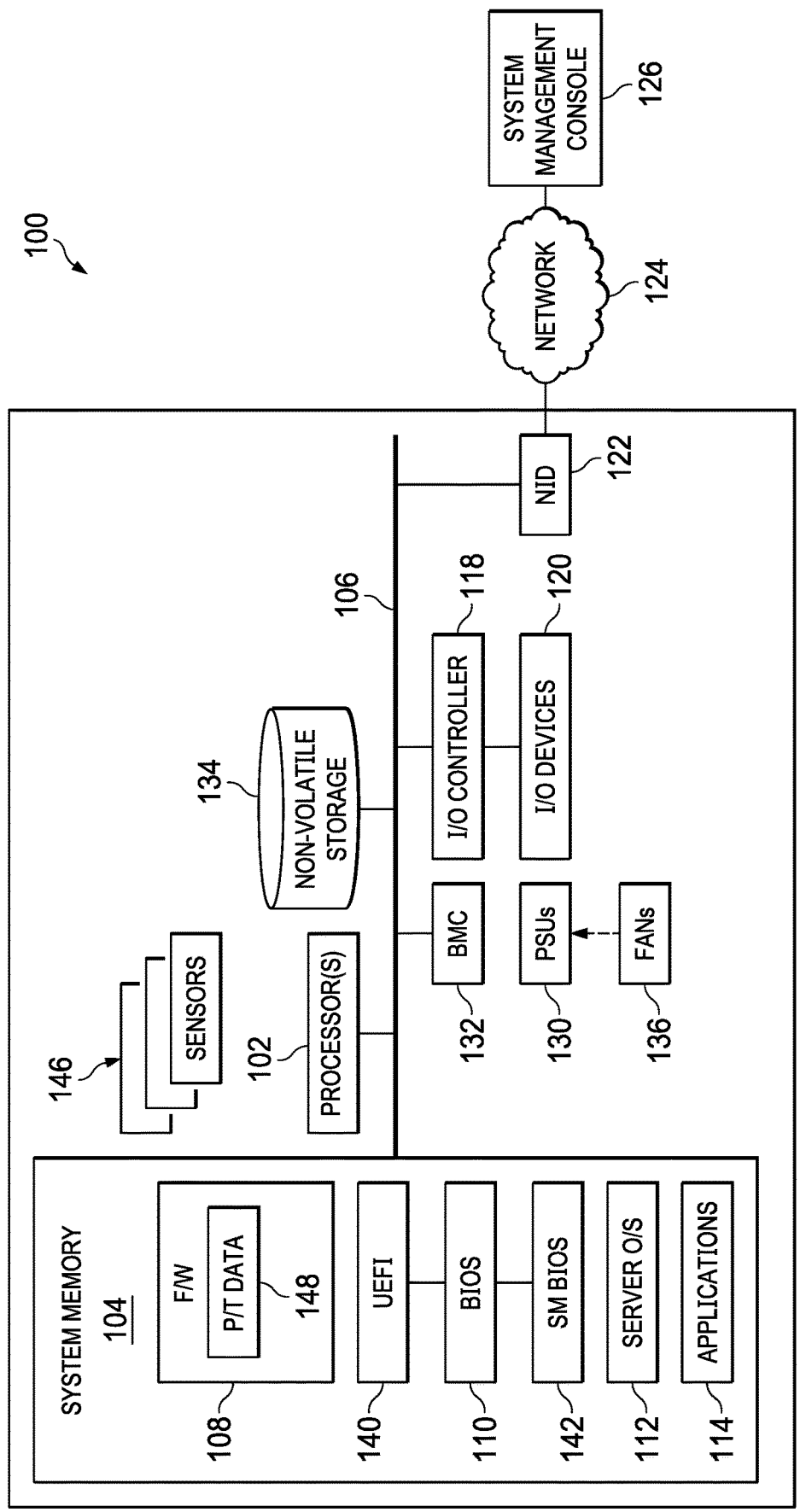
FIG. 1 is a block diagram of examples of components of an Information Handling System (IHS) according to one embodiment of the present disclosure.

Embodiments described herein comprise a multi-boot system and method for a baseboard management controller (BMC) that can boot or launch multiple, different firmware stacks on the BMC. Whereas custom BMC firmware stacks may be created and implemented with little or no control over how the BMC hardware or its associated IHS is configured, they may exhibit certain problems that, if not resolved, can inflict damage to the IHS or even the BMC hardware itself. Embodiments of the present disclosure provide a solution to this problem, among others, using a system and method that enables switching to another different BMC firmware stack, such as a standard BMC firmware stack, that provides a known good stable operating environment in certain scenarios when the custom BMC firmware stack exhibits problems. Additionally, the multi-boot system and method may provide an advantage in that a different BMC firmware stack may be selectively booted on the BMC to provide functionality that may not be available on the currently running BMC firmware stack.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration.

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

While custom BMC firmware stacks, such as those implemented according to openBMC standards, may provide enhanced manageability, transparency, and customization, its implementation has not been without drawbacks. For example, standard BMC firmware stacks are often implemented by the vendor of the IHS in which the BMC is deployed and therefore, the quality and reliability of the BMC's functionality can be controlled to a relatively good degree. One example of such a standard BMC firmware stack is the iDRAC firmware stack provided by the DELL CORPORATION. On the other hand, custom BMC firmware stacks, which are typically developed in uncontrolled environments, often possess relatively higher levels of software faults (e.g., bugs).

This drawback can be particularly problematic when certain control functions allocated to the BMCs can ruin or damage their respective IHSs if not properly managed. For example, whereas BMCs may be configured to control the fan speed of any of a number of fans configured in the IHS, either inadvertent or malicious algorithms within the custom BMC firmware stack can cause the fans to turn too slowly, thus yielding an overheating condition which in turn may cause physical damage. As another example, modern day BMCs are often configured with small memory components (e.g., an electronic multimedia card (eMMC)) due to their relatively low cost and small size; nevertheless, excessive read/write cycle rates caused by custom BMC firmware stack algorithms can cause damage to these memory components.

Traditionally, BMCs have been provided with dual BMC firmware stacks in order to provide a level of redundancy. In the event that a currently executed BMC firmware stack becomes non-functional, for example, a recovery path may be provided by booting to the alternate BMC firmware stack. In such cases, however, both versions of the firmware have been same, even when the BMC firmware stacks are provided from the same vendor. The intent has been to provide redundancy, not diversity that would otherwise be provided by different versions of BMC firmware stacks. With the wider acceptance of openBMC in the industry, it would be beneficial for IHS vendors to provide such diversity to handle scenarios where the openBMC-based BMC firmware stacks are being deployed on their IHSs.

For example, standard BMC firmware stacks (e.g., iDRAC) typically provide a greater level of functionality than provided by their custom BMC firmware stack counterparts. Thus, it would be useful to enable switching between a custom BMC firmware stack and a standard BMC firmware stack so that the advantages of both custom BMC firmware stacks (e.g., manageability, transparency, and customization, etc.) as well as standard BMC firmware stacks (e.g., functionality, reliability, etc.) can be realized. Additionally, from a security standpoint, running dissimilar BMC firmware stacks (e.g., developed from different code bases) warrants protecting one from another during run time. That is, the code and data that one BMC firmware stack generates should be protected from possible tampering by the other BMC firmware stack. Embodiments of the present disclosure provide a system and method for selecting a BMC firmware stack from among multiple BMC firmware stacks for execution on a BMC so that its performance and reliability can be optimized.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS), according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I²C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
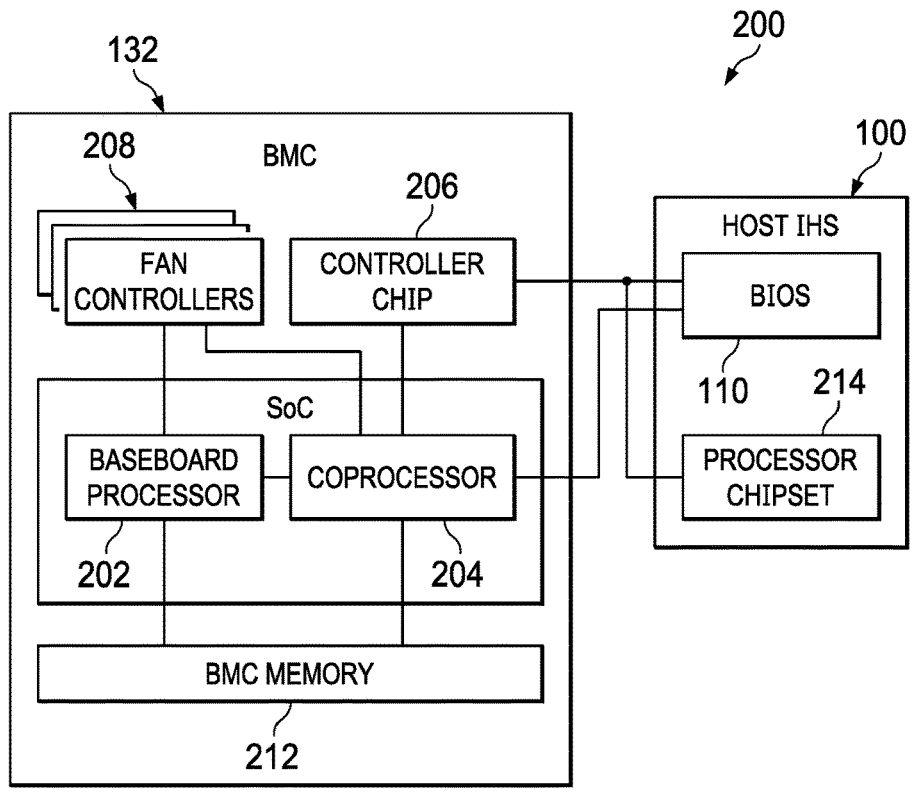
FIG. 2 is a diagram illustrating several components of an example BMC along with those of an associated IHS 100 that may be used to implement a BMC multi-boot system according to one embodiment of the present disclosure.

FIG. 2 is a diagram illustrating several components of an example BMC 132 along with those of an associated IHS 100 that may be used to implement a BMC multi-boot system 200 according to one embodiment of the present disclosure. BMC 132 generally includes a baseboard processor 202, a coprocessor 204, a controller chip 206, one or more fan controllers 208, and a BMC memory 212. The IHS 100 on the other hand, is shown including a BIOS 110, and a processor chipset 214. As shown, the baseboard processor 202 and coprocessor 204 may be provided together in a system on chip device 216. In other embodiments, the baseboard processor 202 and coprocessor 204 may be provided as discreet entities. The BMC 132 and IHS 100 are shown with those components described above for purposes of brevity and clarity of discussion, it should be appreciated that either of the BMC 132 and/or IHS 100 may be configured with additional, fewer, or different components without departing from the spirit and scope of the present disclosure.

The BMC memory 212 may be integrally formed with the baseboard processor 202, coprocessor 204, and/or controller chip 206, or it may be discreetly separate therefrom. In one embodiment, the BMC memory 212 may be implemented on a memory device (e.g., an electronic multimedia card (eMMC), an electronic universal flash storage (eUFS), or a low-power double data rate (LPDDR) memory device, etc.). Additional details associated with contents stored in the BMC memory 212 will be described in detail herein below.

Baseboard processor 202 may include any suitable type of processor, such as an advanced RISC machine (ARM) processor. Baseboard processor 202 executes a standard BMC firmware stack (not shown) or a custom BMC firmware stack 310 that is stored in a BMC memory 212. A standard BMC firmware stack may be, for example, an IHS vendor provided firmware stack (e.g., an iDRAC provided by the DELL CORPORATION), while the custom BMC firmware stack 310 may be one created by a user of the IHS, such as one implemented using the openBMC framework. The custom BMC firmware stack 310 may provide out-of-band monitoring and management of the components of the IHS 100. Examples of monitoring functions that the custom BMC firmware stack 310 may provide include, for example, monitoring internal ambient temperatures and/or voltages in the IHS 100, along with monitoring CPU, memory, network usage levels, and the like. Examples of management features may include installation of software including the base operating system, of the IHS 100, controlling fan speed of one or more fans in the IHS 100, turning certain resources of the IHS 100 on or off, and the like.

Coprocessor 204 functions independently of baseboard processor 202 to assist the ARM processor in performing one or more functions associated with the operation of the BMC. Custom BMC firmware stacks are typically created by users whose development efforts are not closely controlled by the vendor of the IHS 100 and as such, it may include logic that may not be aware of all the intricacies of the IHS 100 it is designed to manage. Thus, the coprocessor 204 may be configured with logic for providing out-of-band monitoring of these custom BMC firmware stacks. According to embodiments of the present disclosure, the coprocessor 204 may also be configured to perform certain tests on the baseboard processor 202 to ensure proper operation of the custom BMC firmware stacks. Thus, the coprocessor 204 may provide testing capabilities of the baseboard processor 202 regardless of what type of logic that it is implemented with. Additionally, embodiments of the present disclosure may provide test capabilities over other processors configured in the IHS 100, such as the controller chip 206, or other peripheral systems (e.g., PERC controllers, etc.).

Controller chip 206 includes logic for controlling certain features of the IHS 100 and/or BMC 132. In one embodiment, a Complex Programmable Logic Device (CPLD) can be used to implement the controller chip. For example, the controller chip 206 may include logic for, in response to receiving certain input signals, activating or deactivating one or more signals or messages to the baseboard processor 202 and/or coprocessor 204. As another example, the controller chip 206 may include logic for disabling the baseboard processor 202 or coprocessor 204 by holding it in reset so that it cannot boot.

Although FIG. 2 describes one example of a BMC 132 that may be used to implement the multi-boot system, the features of the disclosed BMC 132 may be embodied in other specific forms without deviating from the spirit and scope of the present disclosure. For example, the BMC 132 may perform additional, fewer, or different components than those operations as described in the present example. In a particular example, the BMC 132 may be void of any coprocessor 204, controller chip 206, or fan controllers 208 if not needed or desired. Additionally, the controller chip 206 may be configured on the IHS 100 external to the BMC 132.

Figure 3:
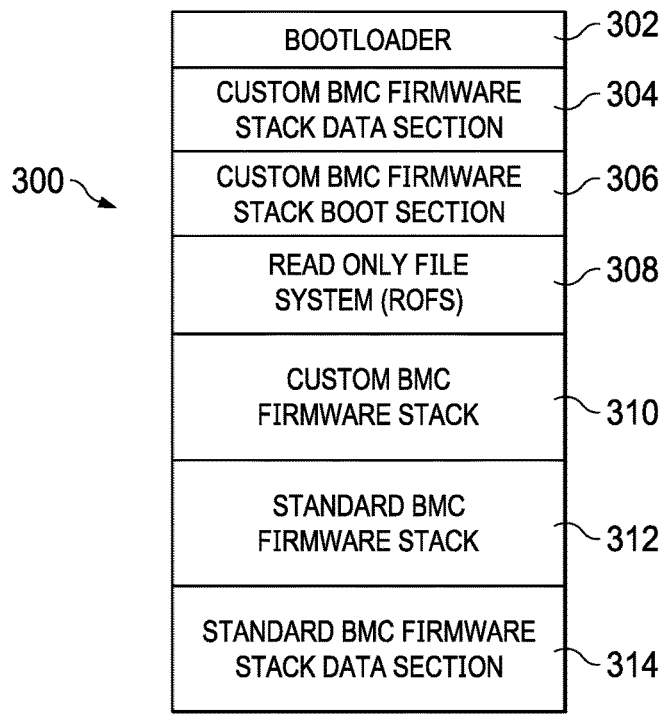
FIG. 3 illustrates an example memory map that may be configured in the BMC memory according to one embodiment of the present disclosure.

FIG. 3 illustrates an example memory map 300 that may be configured in the BMC memory 212 according to one embodiment of the present disclosure. The memory map 300 includes a bootloader 302, a custom BMC firmware stack data section 304, a custom BMC firmware stack boot section 306, a read only file system (ROFS) 308, a custom BMC firmware stack 310, a standard BMC firmware stack 312, and a standard BMC firmware stack data section 314. The custom BMC firmware stack boot section 306, ROFS 308, and custom BMC firmware stack 310 generally comprise a storage area that is allocated for use by the custom BMC firmware stack 310, while the standard BMC firmware stack 312, and standard BMC firmware stack data section 314 generally comprise a storage area allotted to the standard BMC firmware stack 312.

Although the memory map 300 is shown herein having a custom BMC firmware stack 310 and a standard BMC firmware stack 312, it should be appreciated that the memory map 300 may store other types and combinations of BMC firmware stacks without departing from the spirit and scope of the present disclosure. For example, the memory map 300 may store two custom BMC firmware stacks 310, such as may be the case where the user desires to execute different versions of the same custom BMC firmware stack's base code. Additionally, it is contemplated that the memory map 300 may include storage for three or more BMC firmware stacks that can be alternatively be executed by the BMC 132. For example, different versions of a BMC firmware stack base code may refer to a first version (e.g., version 1.0) that was released with a certain set of features, and a second version (e.g., version 2.1) that was released at a later point in time to fix certain bugs and/or incorporate one or more new features not present in the earlier release (version 1.0). Furthering this example, generating the second version (e.g., version 2.1) would often entail adding to and/or changing the executable instructions that were used to generate the first version (e.g., version 1.0).

The bootloader 302 is typically stored in a separate partition commonly referred to as a master boot record (MBR). The bootloader 302 may include any type of executable code for launching or booting the custom BMC firmware stack 310 and standard BMC firmware stack 312 on the BMC 132. In one embodiment, the bootloader 302 includes a Universal boot loader (Das U-Boot), which is provided under an open source license, and is primarily used in embedded processor devices to bootstrap the BMC firmware stack's operating system's kernel.

In one embodiment, the bootloader 302 includes logic for hiding (obfuscating) the BMC firmware stack that is not currently being executed from the other BMC firmware stack that is currently being executed. In another embodiment, the bootloader 302 may include logic for enforcing certain access policies associated with the BMC firmware stack currently being executed. For example, since a standard BMC firmware stack 312 mostly includes logic that is developed by the vendor, and thus well controlled, the bootloader 302 may allow the standard BMC firmware stack 312 to have relatively free access to the code region (e.g., custom BMC firmware stack boot section 306, ROFS 308, and custom BMC firmware stack 310) associated with the custom BMC firmware stack 310. Because the logic of the custom BMC firmware stack 310 may be inherently less controlled, however, the bootloader 302 may be configured with policies to restrict the custom BMC firmware stack 310 from having access to the code region (e.g., standard BMC firmware stack 312, and standard BMC firmware stack data section 314) associated with the standard BMC firmware stack 312. Additionally, the bootloader 302 may be configured with policies for restricting access to certain portions of the other non-used BMC firmware stack storage areas. For example, the bootloader 302 may include polices for restricting a currently executed BMC firmware stack 310, 312 to only the standard BMC firmware stack data section 314 while allowing access to the standard BMC firmware stack 312 in some scenarios.

In one embodiment, the bootloader 302 be configured to restrict the launching (execution) of a certain type of BMC firmware stack (custom BMC firmware stack 310 or standard BMC firmware stack 312) according to whether or not the BMC 132 is licensed to do so. Within this disclosure, the term 'license' means a right to perform a particular operation, which in the present case is a right to alternatively launch and execute different types of BMC firmware stacks on the BMC 132. For example, the license may provide the right to, when currently executing a BMC firmware stack having a certain type (e.g., custom BMC firmware stack 310), switching over to executing a different BMC firmware stack of another certain type (e.g., standard BMC firmware stack 312). In some cases, the license may be consummated via a financial transaction between a user and an administrator of the IHS/BMC 100/132 combination. The administrator may be any entity that oversees, guarantees, or warranties the operation of the IHS 100, such as a vendor that assembled, manufactured, sold, or otherwise provided the IHS 100 to the user.

In another embodiment, information associated with the license rights may be stored in one or more one time programmable (OTP) bits provided in the baseboard processor 202. For example, executable code in the bootloader 302 or other BMC 132 or IHS 100 service may include logic for presenting a user interface to the user offering to allow certain BMC firmware stack switchover operations. If the user agrees, the executable code may then provision the BMC 132 to allow such operations by writing the information associated with the license rights in the OTP bit of the baseboard processor 202. Storing the license rights in the OTP bits may provide an advantage in that they form a relatively permanent association of the license rights to the BMC 132. That is, the license rights are tightly coupled to a particular BMC 132, even if the BMC 132 is physically migrated to another IHS 100. In another embodiment, the license rights may be encrypted so that they cannot be spoofed on another, different BMC 132. That is, a cryptographic hash may be performed using one or more variables (e.g., version ID number, IHS unique ID, BMC unique ID, etc.) on the license rights, which is then stored in the OTP bits as the stored license rights information.

In one embodiment, the bootloader 302 may be configured to suspend and/or hibernate a currently executed BMC firmware stack 312, 314. Suspending a BMC firmware stack generally involves storing the working state of the currently executed BMC firmware stack in read-only memory (ROM), while hibernating generally involves storing the working state of the currently executed BMC firmware stack in non-volatile memory (e.g., hard disk).

While a bootloader 302 is described herein for switching between execution of different BMC firmware stacks, it is contemplated that a hypervisor may also be implemented that allows different BMC firmware stacks to be concurrently executed in which the active BMC firmware stack is manually selected by the user. For example, the hypervisor may present a user interface to the user so that the user may select which BMC firmware stack is active at any one point in time.

The custom BMC firmware stack data section 304 and standard BMC firmware stack data section 314 each store working data associated with the operation of their respective custom BMC firmware stack 310 and standard BMC firmware stack 312. Thus as can be seen, the data for each BMC firmware stack is separate so that the operation of one is limited from adversely affecting the working data of the other BMC firmware stack. The custom BMC firmware stack boot section 306 generally refers to a code segment associated with the custom BMC firmware stack 310 that is pointed to by the bootloader 302. That is, when the bootloader 302 launches the custom BMC firmware stack 310, it instructs the baseboard processor 202 to commence execution at the custom BMC firmware stack boot section 306 so that it can perform certain operations or procedures for preparing the custom BMC firmware stack 310 to be executed on the baseboard processor 202.

Figure 4:
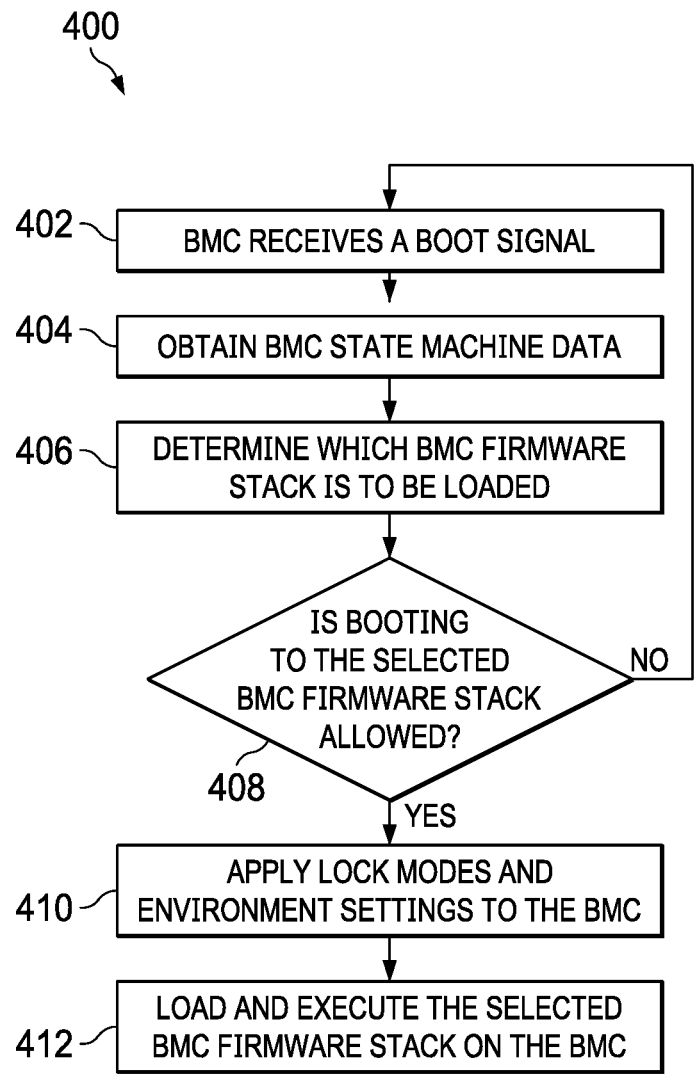
FIG. 4 illustrates an example custom BMC multi-boot method that may be performed to alternatively boot one from among multiple BMC firmware stacks on the BMC according to one embodiment of the present disclosure.

FIG. 4 illustrates an example custom BMC multi-boot method 400 that may be performed to alternatively boot one from among multiple BMC firmware stacks on the BMC 132 according to one embodiment of the present disclosure. In one embodiment, the method 400 may be performed each time the BMC 132 is initially booted after the BMC 132 is powered on, such as when its host IHS 100 is re-booted. Additionally or alternatively, some, most, or all steps of the method 400 may be performed by the bootloader 302 stored in the BMC memory 212.

At step 402, the BMC 132 receives a boot signal, such as in response to a power on condition. Thereafter at step 404, the method 400 obtains state machine data associated with operation of the BMC 132. The state machine data may include, for example, configuration settings associated with the BMC 132 or portions of its host IHS 100 it is configured to monitor and/or control.

At step 406, the method 400 determines which BMC firmware stack is to be loaded or launched by the BMC 132. The BMC firmware stack may be either a standard BMC firmware stack 312 or a custom BMC firmware stack 310. For example, the method 500 may read the boot flags of each stored BMC firmware stack to determine which BMC firmware stack stored in BMC memory 212 is to be loaded. Although the BMC memory 212 is described herein with two different BMC firmware stacks, it should be appreciated that the method 400 may be configured to select from among any number (e.g., three or more) of BMC firmware stacks from which to load and executed on the BMC 132.

At step 408, the method 400 determines whether booting to the selected BMC firmware stack is allowed. The method 400 may be configured to limit switchover based upon a type of the selected BMC firmware stack, and any licensing agreements that have been consummated between the user and the administrator of the BMC 132 regarding a right to run the selected BMC firmware stack. For example, the method 400 may detect the type of selected BMC firmware stack, and compare the detected information against the license rights stored in the OTP bits of the baseboard processor 202. If booting the selected BMC firmware stack is not allowed, processing continues at step 402 in which the method 400 selects another BMC firmware stack for booting on the BMC 132. For example, one BMC firmware stack stored in the BMC memory 212 may be configured to be a default BMC firmware stack that is loaded when loading of another BMC firmware stack is not successful. Otherwise if booting the selected BMC firmware stack is allowed, processing continues at step 410.

At step 410, the method 400 applies certain lock modes and environment settings to the BMC 132. For example, the method 400 may lock the memory of the non-currently executed BMC firmware stacks from being accessed by the selected BMC firmware stack. The method 400 may also lock the selected BMC firmware stack from accessing (e.g., reading or setting) certain functions of the baseboard processor 202 or coprocessor 204. Such locking of the component of the BMC 132 may be useful for cases where a custom BMC firmware stack 310 is selected so that its ability to cause harm or damage may be reduced or eliminated. Thereafter at step 412, the selected BMC firmware stack is loaded and executed on the BMC 132.

The method 400 described above may be repeatedly performed each time the BMC 132 is re-booted. Nevertheless, when use of the method 400 is no longer needed or desired, the method 400 ends.

Although FIG. 4 describes one example of a method that may be performed to selectively boot from among multiple BMC firmware stacks of a BMC 132, the features of the disclosed process may be embodied in other specific forms without deviating from the spirit and scope of the present disclosure. For example, the method 400 may perform additional, fewer, or different operations than those operations as described in the present example. As another example, certain steps of the aforedescribed process may be performed by other components of the BMC 132 and/or IHS 100, such as by certain processes other than the bootloader 302 executed on the BMC 132 or its host IHS 100.

Figure 5:
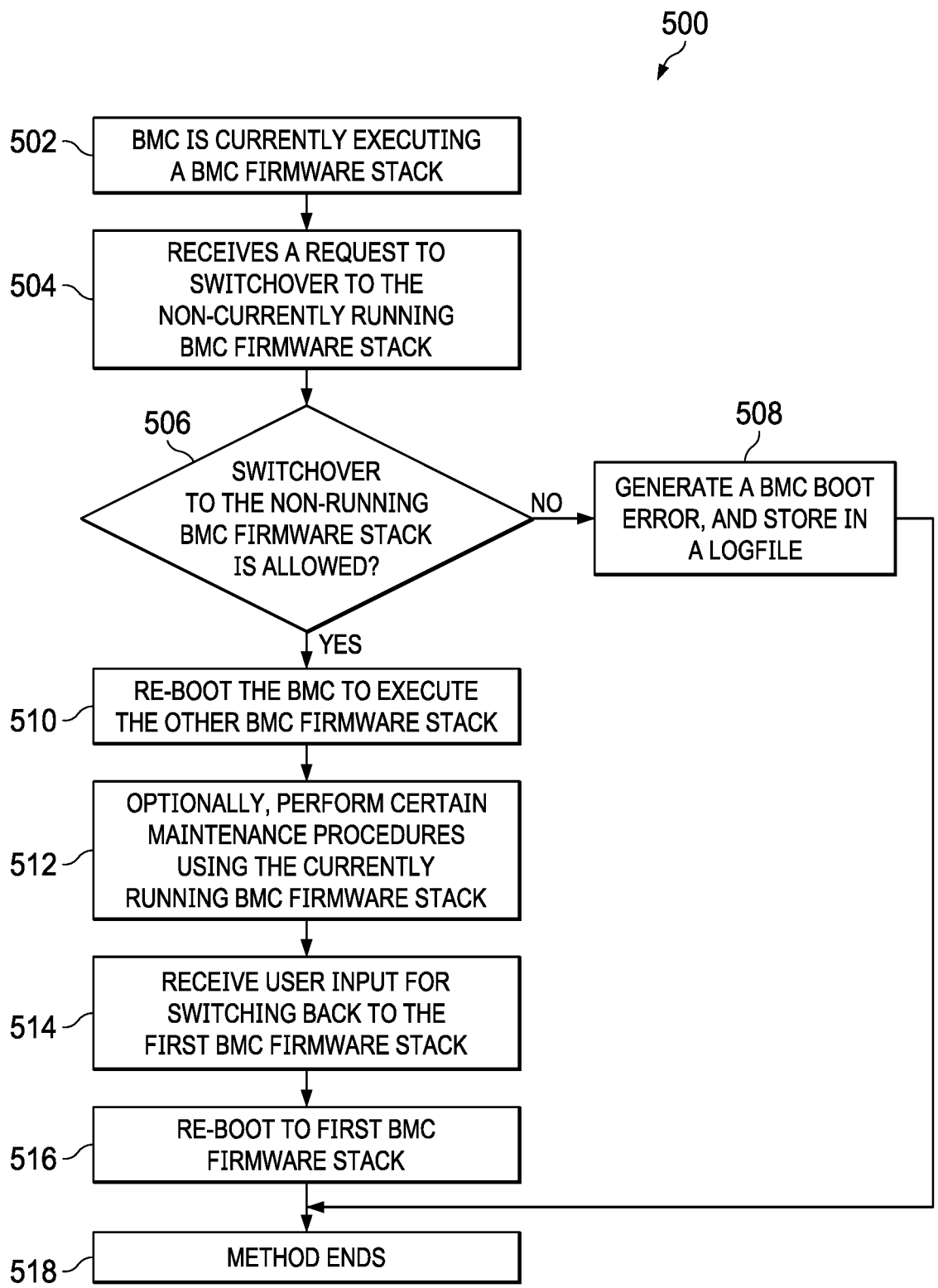
FIG. 5 illustrates another example custom BMC multi-boot method that may be performed to alternatively switch from among multiple BMC firmware stacks on the BMC according to one embodiment of the present disclosure.

FIG. 5 illustrates another example custom BMC multi-boot method 500 that may be performed to alternatively switch from among multiple BMC firmware stacks on the BMC 132 according to one embodiment of the present disclosure. Initially, the BMC 132 has been previously booted with one of multiple, different BMC firmware stacks stored in the BMC memory 212. For example, the BMC 132 may be running a custom BMC firmware stack 310, while another standard BMC firmware stack 312 is stored in the BMC memory 212. As another example, the BMC 132 may be currently running a particular version of a custom BMC firmware stack 310, while another custom BMC firmware stack 310 with a different version is stored in the BMC memory 212.

At step 502, the BMC 132 is currently executing a first BMC firmware stack. The first (i.e., currently executed BMC firmware stack) may be either a standard BMC firmware stack 312 or a custom BMC firmware stack 310. Thereafter at step 504, the method 500 receives a request to switchover to a second (i.e., non-currently running BMC firmware stack). In a particular example, the request may be a manual request generated by the user via a remote login session, such a Redfish remote login session. In another particular example, the request may be triggered by executable code that detects when certain maintenance operations are requested by the user. Because most standard BMC firmware stacks may be configured to perform operations that, in some cases, cannot be accomplished with their custom BMC firmware stack counterparts, the method 500 may detect such requests when a custom BMC firmware stack 310 is currently being executed, and trigger the request. In some cases, when the method 500 detects such a scenario, it may set a flag so that the switchover is triggered whenever the host IHS 100 is re-booted the next time.

At step 506, the method 500 determines whether switchover to the second BMC firmware stack is allowed. The method 500 may be configured to limit switchover based upon a type of the second BMC firmware stack, a type of the first BMC firmware stack, and any licensing agreements that have been consummated between the user and the administrator of the BMC 132, which involve the first (currently running BMC firmware stack) and/or second (non-currently running) BMC firmware stack. For example, the method 500 may detect what type of BMC firmware stack is currently running on the BMC 132, a type of BMC firmware stack that is to be switched to, and compare the detected information against the license rights stored in the OTP bits of the baseboard processor 202. If the switchover is not allowed, processing continues at step 508; otherwise, processing continues at step 510.

At step 508, the method 500 generates a BMC boot error, and stores information associated with the BMC boot error in a logfile. Such information may be useful for identifying when the invalid boot request occurred as well as how often multiple of the BMC boot errors may have occurred over time. Processing then continues at step 518 in which the method ends.

Nevertheless, if the switchover is allowed, processing continues at step 510 in which the method 500 re-boots the BMC 132 to execute the second BMC firmware stack. In one embodiment, the BMC 132 is re-booted using a suitable bootloader, such as a Universal boot loader (Das U-Boot). At this point, the second BMC firmware stack has become the currently running BMC firmware stack on the BMC 132.

As described above, cases exist where it may be beneficial to switchover to a standard BMC firmware stack 312 to perform certain maintenance operations that may not be able to be performed by the previously running BMC firmware stack (e.g., custom BMC firmware stack 310). Thus, if the now currently executed BMC firmware stack is a standard BMC firmware stack 312, the method 500 may perform those maintenance procedures using the standard BMC firmware stack 312. One example of such a maintenance operation may include downloading and installing update packages from an online website, where the standard BMC firmware stack 312 may possess the necessary information for accessing the web site as well as providing session login information when the website requires that downloading of certain update packages to be conducted from within a login session. Another example of a maintenance operation that may need to be performed by a standard BMC firmware stack 312 is one where certain regions of BMC memory 212 or hardware manipulation required to perform the operation are restricted from access by the custom BMC firmware stack 310. Thus, at step 512, the method 500 may optionally perform one or more maintenance operations using the second BMC firmware stack.

At this point, the second BMC firmware stack may be continually executed ad infinitum to perform its various services, such as performing certain maintenance operations as described above at step 512. Nevertheless, when the method 500 receive user input to switch back to the first or previously running BMC firmware stack at step 514, processing continues at step 516 in which the BMC 132 is re-booted to again launch or execute the first BMC firmware stack. For example, the method 500 may receive user input for setting a boot flag on the first BMC firmware stack such that it is selected for booting by the bootloader when the BMC 132 is re-booted. Furthering this example, executable code may exist for automatically setting the boot flag on the first BMC firmware stack in response to certain triggering actions, such as completion of one or more BMC configuration scripts performed by the second BMC firmware stack. When the BMC 132 has been re-booted to the first BMC, the method ends at step 518.

The aforedescribed method 500 may be performed each time switchover between first and second BMC firmware stacks is desired. Nevertheless, when use of the method 500 is no longer needed or desired, the method 500 ends.

Although FIG. 5 describes one example of a method that may be performed for switching between first and second BMC firmware stacks on a BMC 132, the features of the disclosed process may be embodied in other specific forms without deviating from the spirit and scope of the present disclosure. For example, the method 500 may perform additional, fewer, or different operations than those operations as described in the present example. As another example, the method 500 may be configured to switch from among three or more different BMC firmware stacks that are stored on the BMC memory 212 and available to be booted by the BMC 132.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An information handling system (IHS), comprising:
a plurality of hardware devices; and
a baseboard management controller (BMC) in communication with the plurality of hardware devices, the BMC comprising one or more processors and one or more memory units including instructions that, upon execution by the processors, cause the BMC to:
begin execution of an openBMC firmware stack, wherein the openBMC firmware stack has been implemented by an entity that is separate and distinct from a vendor of the IHS;
when the openBMC firmware stack is being executed, inhibit the openBMC firmware stack from performing at least one function of the BMC; during execution of the openBMC firmware stack, halt execution of the openBMC firmware stack, and begin execution of a vendor-based BMC firmware stack, wherein the vendor-based BMC firmware stack is provided by a vendor of the IHS in which the BMC is configured; and when the vendor-based BMC firmware stack is being executed, allow the vendor-based BMC firmware stack to perform the at least one function of the BMC.

2. The IHS of claim 1, wherein the instructions, upon execution, further cause the BMC to:

during the execution of the vendor-based BMC firmware stack, halt the execution of the vendor-based BMC firmware stack, and begin a second execution of the openBMC firmware stack.

3. The IHS of claim 1, wherein the vendor-based BMC firmware stack is configured to perform one or more maintenance operations for the IHS.

4. The IHS of claim 1, wherein the instructions, upon execution, further cause the BMC to inhibit the openBMC firmware stack from accessing the vendor-based BMC firmware stack stored in a portion of the memory units.

5. The IHS of claim 1, wherein the instructions, upon execution, further cause the BMC to store information associated with the license in one or more one time programmable (OTP) bits in the baseboard processor.

6. The IHS of claim 1, wherein the instructions comprise a bootloader that is executed to:

halt the execution of the openBMC firmware stack, and begin the execution of the vendor-based BMC firmware stack; and enforce one or more access policies based on whether the openBMC firmware stack or vendor-based BMC firmware stack is currently being executed, the access policies indicating a level of access that the openBMC firmware stack has to a portion of memory units that stores the vendor-based BMC firmware stack.

7. The IHS of claim 1, wherein the instructions comprise a hypervisor that is executed to:

halt the execution of the openBMC firmware stack, and begin the execution of the vendor-based BMC firmware stack; and enforce one or more access policies based on whether the openBMC firmware stack or vendor-based BMC firmware stack is currently being executed, the access policies indicating a level of access that the openBMC firmware stack has to a portion of memory units that stores the vendor-based BMC firmware stack.

8. The IHS of claim 1, wherein the instructions, upon execution, further cause the BMC to perform at least one of suspending the currently executed first or vendor-based BMC firmware stack, and hibernating the currently executed first or vendor-based BMC firmware stack.

9. A method comprising:

beginning, using instructions stored in at least one memory and executed by at least one processor, execution of an openBMC firmware stack on a baseboard management controller (BMC) in communication with a plurality of hardware devices of an information handling system (IHS), wherein the openBMC firmware stack has been implemented by an entity that is separate and distinct from a vendor of the IHS; and when the openBMC firmware stack is being executed, inhibiting the openBMC firmware stack from performing at least one function of the BMC;

during execution of the openBMC firmware stack, halting, using the instructions, execution of the openBMC firmware stack, and begin execution of a vendor-based BMC firmware stack, wherein at least a portion of the executable instructions used to generate openBMC firmware stack are different than the executable instructions used to generate the vendor-based BMC firmware stack; and when the vendor-based BMC firmware stack is being executed, allowing the vendor-based BMC firmware stack to perform the at least one function of the BMC.

10. The method of claim 9, further comprising:

during the execution of the vendor-based BMC firmware stack, halt the execution of the vendor-based BMC firmware stack, and begin a second execution of the openBMC firmware stack.

11. The method of claim 10 further comprising performing one or more maintenance operations for the IHS by the vendor-based BMC firmware stack.

12. The method of claim 11, further comprising inhibiting the custom BMC firmware stack from accessing the vendor-based BMC firmware stack stored in a portion of the memory units.

13. The method of claim 9, further comprising storing information associated with the license in one or more one time programmable (OTP) bits in the baseboard processor.

14. The method of claim 9, further comprising:

halting, by a bootloader, the execution of the openBMC firmware stack, and begin the execution of the vendor-based BMC firmware stack; and enforcing, by the bootloader, one or more access policies based on whether the openBMC firmware stack or vendor-based BMC firmware stack is currently being executed, the access policies indicating a level of access that the openBMC firmware stack has to a portion of memory units that stores the vendor-based BMC firmware stack.

15. An information handling system (IHS), comprising:
a plurality of hardware devices; and
a baseboard management controller (BMC) in communication with the plurality of hardware devices, the BMC comprising one or more processors and one or more memory units including instructions that, upon execution by the processors, cause the BMC to:

receive selection of an openBMC firmware stack, wherein the openBMC firmware stack has been implemented by an entity that is separate and distinct from a vendor of the IHS;

begin execution of the openBMC firmware stack;

when the openBMC firmware stack is being executed, inhibit the openBMC firmware stack from performing at least one function of the BMC;

during execution of the openBMC firmware stack, halt execution of the openBMC firmware stack, and begin execution of a vendor-based BMC firmware stack, wherein the vendor-based BMC firmware stack is provided by a vendor of the IHS in which the BMC is configured; and when the vendor-based BMC firmware stack is being executed, allow the vendor-based BMC firmware stack to perform the at least one function of the BMC.

* * * * *